United States Patent [19]

Macedo et al.

[11] 4,299,608
[45] * Nov. 10, 1981

[54] JOINT DOPING OF POROUS GLASSES TO PRODUCE MATERIALS WITH HIGH MODIFIER CONCENTRATIONS

[75] Inventors: Pedro B. Macedo, 6100 Highboro Dr., Bethesda, Md. 20034; Mrinmay Samanta, Washington, D.C.; Joseph H. Simmons, Potomac, Md.

[73] Assignees: Pedro Buarque de Macedo, Bethesda; Theodore Aaron Litovits, Silver Spring, both of Md.

[*] Notice: The portion of the term of this patent subsequent to Feb. 12, 1997, has been disclaimed.

[21] Appl. No.: 75,713

[22] Filed: Sep. 14, 1979

Related U.S. Application Data

[62] Division of Ser. No. 755,590, Dec. 30, 1976, Pat. No. 4,183,620.

[51] Int. Cl.³ ............................................. C03C 25/02
[52] U.S. Cl. ......................................... 65/3.1; 65/31; 65/30.13
[58] Field of Search ................. 65/3 A, 3 R, 30 R, 31

[56] References Cited

U.S. PATENT DOCUMENTS

| | | | |
|---|---|---|---|
| 3,859,073 | 1/1975 | Schultz | 65/60 D |
| 3,938,974 | 2/1976 | Macedo et al. | 65/3 R |
| 4,110,093 | 8/1978 | Macedo et al. | 65/3 R |
| 4,110,096 | 8/1978 | Macedo et al. | 65/30 R |
| 4,183,620 | 1/1980 | Macedo et al. | 65/3 A X |
| 4,188,198 | 2/1980 | Macedo et al. | 65/3 A |

*Primary Examiner*—Robert L. Lindsay, Jr.
*Attorney, Agent, or Firm*—Fleit & Jacobson

[57] ABSTRACT

A glass composition having at least 85 mole percent of $SiO_2$, where the improvement comprises at least 7 wt percent of at least one member selected from the group consisting of PbO and $Bi_2O_3$ and at least 1.5 mole percent of at least one member selected from the group consisting of $K_2O$, $Rb_2O$ and $Cs_2O$.

5 Claims, No Drawings

JOINT DOPING OF POROUS GLASSES TO PRODUCE MATERIALS WITH HIGH MODIFIER CONCENTRATIONS

This is a divisional of application Ser. No. 755,590, filed Dec. 3, 1976, now U.S. Pat. No. 4,183,620, granted Jan. 15, 1980.

The use of porous glasses as substrates for the molecular deposition of selected materials has shown great promise in the production of materials with selected physico-chemical properties and selected property variations. This process, called "Molecular Stuffing" or doping has been described in detail in U.S. Pat. No. 3,938,974 and U.S. patent Nos. 4,110,093 and 4,110,096. In addition to such porous glasses, the present invention is applicable to porous glass produced by such other methods as chemical vapor deposition. (See U.S. Pat. No. 3,859,093).

By the molecuar stuffing process, selected solutions containing materials which alter the physico-chemical properties of high silica glasses are diffused into the pores of a high silica base glass preform to achieve a homogeneous concentration of the modifying agent or agents (solute). For step concentration profiles these modifiers are subsequently precipitated and a cladding region is formed by their removal from the outer regions of the preform by a suitable solvent before drying and sintering of the preform assembly. For graded concentration profiles, the concentration of selected modifiers is altered to a desired variation by a second soaking of the preform in selected solvent solutions containing selected concentrations of modifiers. This is followed by precipitation of the modifiers and subsequent drying and sintering of the preform assembly. (See U.S. Pat. No. 4,110,093)

The change in physical property achieved by the addition of dopants is a function of the dopant concentration. Therefore the addition of high dopant concentrations generally induces a large change.

Several products benefit from large variations in physical properties and therefore large variations in dopant concentration. For example, in fiber optics, a large change in index of refraction between the core and cladding regions of a fiber yields a high numerical aperture, while in strengthening brittle materials, a large change in thermal expansion coefficient and/or in glass transition temperature between the surface and the interior of an article allows the formation of large surface compressions (prestressing) and thus the achievement of correspondingly increased strengthening.

The numerical aperture, NA, of a light transmitting device is a measure of its acceptance angle. In optical waveguides the numerical aperture is related to the difference in refractive index, n, between the axis or center of the waveguides and the off axis elements. An increase in numerical aperture is obtained by increases in the index difference between these elements (for example, in waveguides with step index profiles, the difference is between the refractive index of the core, $n_1$, and the clad, $n_2$, regions; thus $NA = \sqrt{n_1^2 - n_2^2}$).

Since numerical aperture is related to the angle of acceptance of the incident light beam, high numerical apertures are desirable since this allows transmission of relatively more energy from a given light source. High numerical apertures are also desirable from the standpoint of reducing microbending losses in optical waveguide fibers, and for the preparation of lens elements and other optical elements.

The process described in U.S. Pat. No. 3,938,974 and U.S. Pat. No. 4,110,093, the disclosures of which are incorporated herein by reference, demonstrates how molecular stuffing of porous glasses may be conducted using a series of dopants both individually and in groups to develop integrated optics components with tailored refractive index distributions and strengthened articles with tailored thermal expansion coefficient and glass transition temperature distributions.

This invention employs glass compositions and dopants similar to those in U.S. Pat. Nos. 4,110,093 and 4,110,096. However, we have found that certain dopants, such as lead, induce noticeable scattering in the glass when large dopant concentrations are used. Though scattering has little effect on most uses such as integrated optics components and strengthened members, some uses such as the transmission of very high quality images (e.g. in cystoscopes) or long, extremely low loss, (e.g. below 20 dB/km) optical fibers with a high numerical aperture (e.g. N.A. greater than 0.35) may be limited by the amount of light scattering present. For example, when lead is used as a dopant oxide at doping concentrations above 40 grs. $Pb(NO_3)_2/100$ cm$^3$ of water, scattering is observed in the final glass. This is an important limitation because lead has a high atomic polarizability and is useful to obtain high index glasses. It would be of considerable advantage if glasses could be made with large concentrations of Pb as a dopant in those situations where a combination of high NA and very low scattering loss were desired.

We have discovered that when the dopant in molecular stuffing is composed of certain combinations of lead and/or bismuth with cesium, rubidium, and/or potassium, then a remarkable and unexpected decrease in the scattering loss occurs. Further, we have discovered that certain of these combinations which give low scattering losses may be used to obtain high numerical apertures and/or high pre-stressing levels as well.

The desired combination of dopants leads to glass articles with the following final composition. The composition of these glasses consists of at least 85 mole percent $SiO_2$ with improvements which comprise at least 7 wt. percent of at least one member selected from Group (I) consisting of PbO and $Bi_2O_3$ and at least 1.5 mole percent of at least one member selected from Group (II) consisting of $K_2O$, $Rb_2O$, and $Cs_2O$.

Even though the maximum dopant concentration is limited by the concentration of $SiO_2$, the broad limits are a maximum of 25 wt. percent for Group (I) and a maximum of 9 mole percent for Group (II). Our preferred range covers at least 2 but not more than 9.5 mole percent $B_2O_3$ and at least 7 but not more than 20 wt. percent of Group (I) and at least 1.5 but not more than 7 mole percent of Group (II).

In another embodiment of this invention, we have discovered that a method which comprises adding a dopant to a porous matrix with interconnective pores, immersing the porous matrix in a solution of a dopant causing the dopant to precipitate in the matrix, removing solvent and where necessary, decomposition products, from the porous matrix and collapsing the porous matrix to a solid form, can be used to produce high silica glasses. These glasses can be produced with the following mixed dopant compositions: Group I being Pb and/or Bi and Group II being K, Rb, and/or Cs in the form of nitrates, carbonates, acetates, borates, phosphates, arsenates and/or silicates in either hydrated or unhydrated form or mixtures therefrom used to produce a glass having a composition of 7 to 25 wt percent (preferred range 7 to 20 wt. percent) of the oxide equivalent of at least one member selected from Group I consisting of Pb and Bi and 1.5 to 9 mole percent (the preferred range being 1.5 to 7 mole percent) of the oxide equivalent of at least one member selected from Group II consisting of K, Rb, and Cs.

Finally in another embodiment of this invention, letting I represent $[Pb(NO_3)_2]$ and $[Bi(NO_3)_2]$, and II represent the alkali nitrates of Cs, Rb and K, taken either singly or in combination, the ranges of dopant which yield glasses with high numerical aperture and low scattering loss are:

|  | Broad g/100 cm$^3$ solution | Preferred g/100 cm$^3$ solution |
|---|---|---|
| Group I | 45–200 | 50–150 |
| Group II | 40–200 | 50–150 | where the weight represents the weight of at least one member of the group in the form of a nitrate salt. The solutions may be water, optionally with small amounts of low molecular weight alcohols such as methanol. The solvents used in precipitating the dopants may be low molecular weight alcohols such as methanol and ethanol.

EXAMPLES

Porous glasses are used as substrates for the deposition of the selected dopant combinations. Any porous glass preform is satisfactory. In this example we prefer to describe a specific method for forming the porous glass substrate by phase separation, although other processes are just as useful. (See for example Schultz, U.S. Pat. No. 3,859,073.)

An alkali borosilicate glass of composition 57% $SiO_2$, 36% $B_2O_3$, 4% $Na_2O$ and 3% $K_2O$ is melted in a Pt crucible in an electric furnace at temperatures between 1300° and 1450° C. The melt is homogenized by stirring with a Pt stirrer, and is then pulled in the form of rods 5/16" diameter by 4' length. These rods are then cut into rods 4" in length which are heat-treated at 550° C. for 1½ hours to induce phase separation and subsequently leached in a 3 N HCl acid solution. During the phase separation heat-treatment, the homogeneous glass decomposes into two phases, one with high silica content and one with high boron and alkali content and lower silica content. These phases are interconneced sufficiently that exposure to the leaching solution completely removes the alkali rich phase leaving behind a high silica porous glass substrate. The porous glass is washed with deionized water.

The porous glass substrate is immersed in a solution containing the desired concentrations of dopants (see Table 1) for 3 hours or longer to allow the solution to fill the pores completely. The dopant compounds are then precipitated from solution.

In following this process we have found it desirable to achieve precipitation of the dopants by thermal means; that is, lowering the temperature of preform and solvent to a point where the solution within the pores becomes supersaturated with the dopant causing the dopant to precipitate in the pores. The sample is then transferred to an unstuffing solution of solvent whereby some of the dopant is allowed to diffuse out of the pores yielding a sample with graded dopant concentration. This step is necessary in both fiber optics to achieve high numerical apertures and in strengthening to achieve high surface compressive stresses. When graded properly, the dopant concentration is nil near the surface of the object thus yielding a low refractive index and/or a low thermal expansion coefficient in the cladding region. The unstuffing step is often conducted sequentially in two different solutions to insure maximum dopant removal from regions near the surface of the object (see Table 1) steps (a) and (b). The sample is kept at 0° C. where it is exposed to vacuum for 24 hours and then heated at 15° C./hour up to 625° C. under vacuum and sintered between 830° and 850° C.

EXAMPLES I, II AND III

Table I reports details (concentration of solution, temperature and times) of the preparation and measurements of refractive index in the core (central) and cladding (outer) regions of the objects made by using lead nitrate and cesium nitrate as dopants. Corresponding numerical apertures are also listed. Table II lists the compositions at the center of the final glass articles. A fiber was pulled from Sample II and scattering losses were found to be less than 20 dB/km in each case.

EXAMPLES IV TO VIII

A porous glass preform prepared as described in Examples I to III is soaked in a dopant solution as described in Table III at a temperature specified in Table III for 16 hours. This temperature is chosen to be at or above the solubility temperature of the designated dopant concentrations. This allows the dopant solution to fill the pores of the preform completely and uniformly. The preform is then removed from the dopant solution and is soaked in a single solvent as specified in Table III for three hours in order to precipitate the dopant within the pores. No dopant removal was attempted since these glasses were made only to observe index change with concentration. The sample is then kept at 0° C. where it is exposed to vacuum for 24 hours and warmed up at 15° C. per hour up to 625° C. also under vacuum. It is then heated to between 830° and 850° C. where sintering occurs. Refractive index measurements conducted on these samples are reported in Table III. Table IV details the compositions of the final glass articles listed for Examples VI and VII.

TABLE I

| Dopant Solution | Dopant Stuffing Temperature | DOPANT UNSTUFFING* | | | Refractive Index Core | Refractive Index Clad | Numerical Aperture |
|---|---|---|---|---|---|---|---|
| | | Time | Temp. | Solvent | | | |
| Example I | | | | | | | |
| 150 g $Pb(NO_3)_2$ + 150 g $Cs(NO_3)$ per 100 ml of aqueous solution | 137° C. | (a) 2 hrs. (b) 1 hr. | 0° C. 0° C. | 50/50 methanol-water solution 100% methanol | 1.527 | 1.459 | 0.45 |
| Example II | | | | | | | |

TABLE I-continued

| Dopant Solution | Dopant Stuffing Temperature | DOPANT UNSTUFFING* Time | Temp. | Solvent | Refractive Index Core | Refractive Index Clad | Numerical Aperture |
|---|---|---|---|---|---|---|---|
| 100 g Pb(NO$_3$)$_2$ + 100 g Cs(NO$_3$) per 100 ml of aqueous solution | 107° C. | (a) 2 hrs. (b) 1 hr. | 0° C. 0° C. | 50/50 methanol-water solution 100% methanol | 1.512 | 1.458 | 0.40 |
| Example III 80 g Pb(NO$_3$)$_2$ + 200 g Cs(NO$_3$) per 100 ml of aqueous solution | 100° C. | (a) 2 hrs. (b) 1 hr. | 0° C. 0° C. | 50/50 methanol-water solution 100% methanol | 1.499 | 1.4558 | 0.36 |

*Unstuffing is done in two steps: solution (a) followed by solution (b).

TABLE II

| Example | SiO$_2$ % mol | wt | B$_2$O$_3$ % mol | wt | Cs$_2$O % mol | wt | PbO % mol | wt |
|---|---|---|---|---|---|---|---|---|
| I | 86 | 64 | 3 | 3 | 5 | 17 | 6 | 16 |
| II | 90 | 72 | 3 | 3 | 3 | 11 | 4 | 14 |
| III | 87 | 67 | 3 | 3 | 6 | 21 | 3 | 9 |

TABLE III

| EXAMPLE | Dopant solution (per 100 ml of aqueous solution) | Dopant solution temperature | Solvent, temp. | Refractive index in core |
|---|---|---|---|---|
| IV | 50 g KNO$_3$ + 95 g Pb(NO$_3$)$_2$ | 120° C. | ethanol 0° C. | 1.506 |
| V | 63 g RbNO$_3$ + 100 g Pb(NO$_3$)$_2$ | 120° C. | ethanol 0° C. | 1.514 |
| VI | 120 g CsNO$_3$ + 100 g [Bi(NO$_3$)$_3$ + 5H$_2$O] | 110° C. | ethanol 0° C. | 1.514 |
| VII | 136 g CsCO$_3$ + 57.1 g Pb(NO$_3$)$_2$ + 57.1 g [Bi(NO$_3$)$_3$ + 5H$_2$O] | 110° C. | ethanol 0° C. | 1.516 |

TABLE IV

| Example | SiO$_2$ % mol | wt | B$_2$O$_3$ % mol | wt | Cs$_2$O % mol | wt | PbO % mol | wt | Bi$_2$O$_3$ mol | wt |
|---|---|---|---|---|---|---|---|---|---|---|
| VI | 91 | 73 | 3 | 3 | 4 | 15 | 0 | 0 | 2 | 9 |
| VII | 89 | 69 | 3 | 3 | 4.5 | 16 | 2.5 | 7 | 1 | 5 |

What is claimed is:

1. In a method of producing a glass article comprising adding a dopant to a porous glass matrix with interconnective pores by immersing the porous glass matrix in a solution of a dopant to impregnate the porous glass matrix with the solution, precipitating the dopant from the solution within the porous glass matrix, removing solvent and where necessary decomposition products from the porous glass matrix and collapsing the porous glass matrix to a solid form, the improvement which comprises immersing the porous glass matrix in a dopant impregnating solution containing a mixture of dopants to impregnate the porous glass matrix with the solution and form an impregnated porous glass matrix with the following composition:
   (I) 7 to 25 weight percent of the oxide equivalent of at least one member selected from the group consisting of Pb and Bi, and
   (II) 1.5 to 9 mole percent of the oxide equivalent of at least one member selected from the group consisting of Cs, Rb, and K.

2. The method according to claim 1 wherein the amount of group (I) is 7 to 20 weight percent and of group (II) is 1.5 to 7 mole percent.

3. The method according to claim 1 in which the dopant impregnating solution is an aqueous solution whose composition is 45 to 200 g of at least one member selected from the group (I) consisting of Pb(NO$_3$)$_2$ and Bi(NO$_3$)$_3$ per 100 cm$^3$ of solution and 40 to 200 g of at least one member selected from the group (II) consisting of CsNO$_3$, RbNO$_3$ and KNO$_3$ per 100 cm$^3$.

4. The method according to claim 3 in which the aqueous solution has 50 to 150 g of group I/100 cm$^3$ of solution and 50 to 150 g of group II/100 cm$^3$ of solution.

5. The method according to claim 3 in which the dopant impregnating solution is an aqueous solution whose composition is 50 to 150 g/100 cm$^3$ of solution of Pb(NO$_3$)$_2$ and 50 to 150 g/100 cm$^3$ of Cs in the form of a nitrate.

* * * * *

UNITED STATES PATENT AND TRADEMARK OFFICE
CERTIFICATE OF CORRECTION

PATENT NO. : 4,299,608
DATED : January 15, 1980
INVENTOR(S) : Pedro B. MACEDO et al It is certified that error appears in the above—identified patent and that said Letters Patent is hereby corrected as shown below:

In Section [73], after "Assignees", second line, change "Litovits" to read --Litovitz--

Signed and Sealed this

Eleventh Day of May 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,299,608
DATED : November 10, 1981
INVENTOR(S) : Pedro B. MACEDO et al It is certified that error appears in the above—identified patent and that said Letters Patent is hereby corrected as shown below:

In Section [73], after "Assignees", second line, change "Litovits" to read --Litovitz--.

This certificate supersedes Certificate of Correction issued May 11, 1982.

Signed and Sealed this

Thirty-first Day of August 1982

[SEAL]

Attest:

GERALD J. MOSSINGHOFF

Attesting Officer — Commissioner of Patents and Trademarks